United States Patent
Dibbad et al.

(10) Patent No.: US 11,493,980 B1
(45) Date of Patent: Nov. 8, 2022

(54) POWER CONTROLLER COMMUNICATION LATENCY MITIGATION

(71) Applicant: QUALCOMM INCORPORATED, San Diego, CA (US)

(72) Inventors: Vijayakumar Ashok Dibbad, Bangalore (IN); Bharat Kumar Rangarajan, Bangalore (IN); Dipti Ranjan Pal, Irvine, CA (US); Keith Alan Bowman, Morrisville, NC (US); Matthew Severson, Austin, TX (US); Gordon Lee, Gilbert, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/322,402

(22) Filed: May 17, 2021

(51) Int. Cl.
  *G06F 1/00* (2006.01)
  *G06F 1/324* (2019.01)
  *H02H 9/02* (2006.01)
  *G06F 1/3296* (2019.01)

(52) U.S. Cl.
  CPC ............ *G06F 1/324* (2013.01); *G06F 1/3296* (2013.01); *H02H 9/02* (2013.01)

(58) Field of Classification Search
  CPC ...................................... G06F 1/324
  See application file for complete search history.

(56) References Cited

U.S. PATENT DOCUMENTS

| | | | |
|---|---|---|---|
| 6,693,782 B1 * | 2/2004 | Lash | H02J 7/00302 361/87 |
| 2012/0086416 A1 * | 4/2012 | Kudo | G06F 1/26 323/265 |
| 2013/0066311 A1 * | 3/2013 | Smith | A61B 18/1233 361/18 |
| 2013/0283083 A1 | 10/2013 | Vilhauer et al. | |
| 2015/0155704 A1 * | 6/2015 | Kikuchi | H02H 7/1213 361/86 |
| 2017/0248996 A1 * | 8/2017 | Zhang | G06F 1/26 |
| 2018/0026537 A1 * | 1/2018 | Vicquery | H02M 1/08 323/271 |
| 2021/0028707 A1 | 1/2021 | Ogaki et al. | |

OTHER PUBLICATIONS

Keith A. Bowman et al., Title: "A 16 nm All-Digital Auto-Calibrating Adaptive Clock Distribution for Supply Voltage Droop Tolerance Across a Wide Operating Range," IEEE Journal of Solid-State Circuits, vol. 51, No. 1, Jan. 2016, pp. 8-17.
International Search Report and Written Opinion—PCT/US2022/024260—ISA/EPO—dated Jul. 20, 2022.

\* cited by examiner

*Primary Examiner* — Mohammed H Rehman
(74) *Attorney, Agent, or Firm* — Smith Tempel Blaha LLC/Qualcomm (57) ABSTRACT

In controlling power in a portable computing device ("PCD"), a power supply input to a PCD subsystem may be modulated with a modulation signal when an over-current condition is detected. Detection of the modulation signal may indicate to a processing core of the subsystem to reduce its processing load. Compensation for the modulation signal in the power supply input may be applied so that the processing core is essentially unaffected by the modulation signal.

26 Claims, 7 Drawing Sheets

POWER CONTROLLER COMMUNICATION LATENCY MITIGATION

DESCRIPTION OF THE RELATED ART

Mobile or portable computing devices ("PCD"s) commonly include mobile phones, laptop, palmtop and tablet computers, portable digital assistants ("PDA"s), portable game consoles, and other portable electronic devices. Still another type of PCD may be used in automotive applications. PCDs commonly contain integrated circuits or systems-on-a-chip ("SoC"s) that include numerous components or subsystems designed to work together to deliver functionality to a user. For example, an SoC may contain any number of processing engines, such as central processing units ("CPU"s), graphical processing units ("GPU"s), digital signal processors ("DSP"s), neural processing units ("NPU"s), wireless transceiver units (also referred to as modems), etc.

"Power management" includes techniques for saving power in battery-powered PCDs and for thermal management in all types of PCDs. In operation, the electronic circuitry within a PCD generates heat or thermal energy, which at excessive levels may be detrimental to the internal circuitry. The amount of thermal energy that is generated may vary depending upon the operating conditions. For example, processors may generate substantial thermal energy when operating at high workload levels. A number of techniques are known to dynamically adjust a power supply voltage to attempt to maximize battery time, control thermal energy production, or provide other power management benefits.

Dynamic clock and voltage scaling ("DCVS") is a technique or method by which the clock frequency and/or voltage at which a processor is operated are adjusted dynamically, i.e., in real time in response to changes in operating conditions, to deliver a desired balance or tradeoff between power consumption and performance level. When lower power consumption or lower thermal energy generation is of higher priority than higher performance, a power controller may decrease the clock frequency and voltage, and when higher performance is of higher priority than lower power consumption or lower thermal energy production, the power controller may increase the clock frequency and voltage. An example of using DCVS is reducing the clock frequency and voltage when it is detected that the current being drawn, which is related to the processing load, exceeds a threshold.

The power controller may be a separate chip from the chip (e.g., SoC) in which the processor subsystems reside. Communication between the processor subsystems and power controller may occur through interrupts or other inter-subsystem communications. Latency in these communications may impact the ability of a processor subsystem and power controller to coordinate efficiently.

SUMMARY OF THE DISCLOSURE

Systems, methods, computer-readable media, and other examples are disclosed for power control in portable computing devices.

An exemplary method for power control in a subsystem of a portable computing device ("PCD") may include detecting a modulation signal in a power input to the subsystem. The exemplary method may further include reducing a processing load of a processing core after a time interval in response to detection of the modulation signal An exemplary system for power control in a subsystem of a PCD may include a processing core, compensation circuitry, and limits management circuitry. The compensation circuitry may be configured to detect a modulation signal in a power input to the subsystem. The limits management circuitry may be configured to control reduction of a processing load of the processing core after a time interval in response to detection of the modulation signal.

Another exemplary system for power control in a subsystem of a PCD may include means for detecting a modulation signal in a power input to the subsystem. The exemplary system may further include means for reducing a processing load of a processing core after a time interval in response to detection of the modulation signal Another exemplary system for power control in a PCD may include a power management integrated circuit ("PMIC") and a system-on-a-chip ("SoC"). The PMIC may be configured to provide a power supply rail, to detect an over-current condition on the power supply rail, and to modulate the power supply rail with a modulation signal when the over-current condition is detected. The SoC may include a subsystem having a power input coupled to the power supply rail. The subsystem may include a processing core, power input compensation circuitry, and limits management circuitry. The power input compensation circuitry may be configured to detect the modulation signal in the power input. The limits management circuity may be configured to alert the processing core to reduce a processing load in response to detection of the modulation signal.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary."

Any aspect described herein as "exemplary" is not necessarily to be construed as preferred or advantageous over other aspects.

Figure 1:
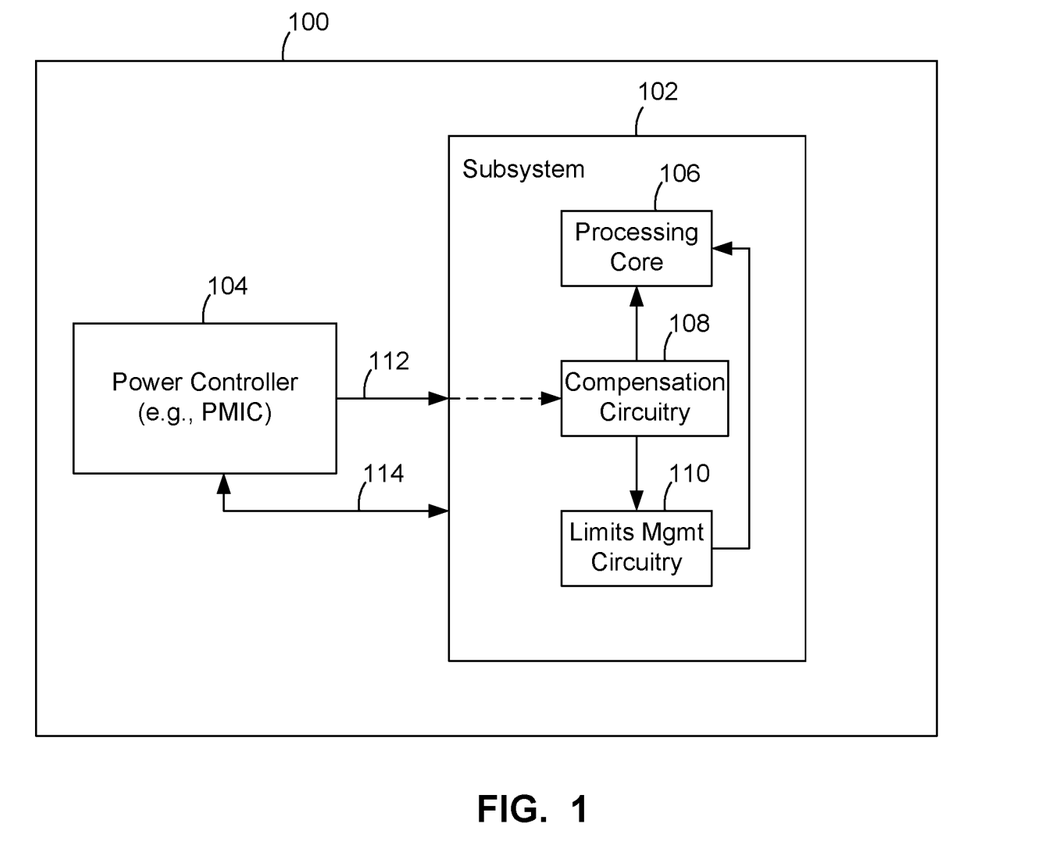
FIG. 1 is a block diagram illustrating a system for system for power control in a portable computing device ("PCD") subsystem, in accordance with exemplary embodiments.

As illustrated in FIG. 1, a portable computing device ("PCD") 100 may include a subsystem 102 and a power controller 104. The subsystem 102 may include a processing core 106, compensation circuitry 108, and limits management circuitry 110. Although only one subsystem 102 is shown for purposes of clarity, the PCD 100 may have any number of subsystems, which may be of various types. Similarly, although only one processing core 106 is shown for purposes of clarity, the subsystem 102 may have any number of processing cores 106. The term "subsystem" refers to a portion of a PCD that includes at least one processing core. The term "processing core" refers to circuitry comprising one or more processors, processing units or other logic configured to process information through the execution of software, firmware, etc. As understood by one of ordinary skill in the art, the processing core 106 requires as one of its inputs a clock signal (not shown) for operation. Terms such as "processing load" and "performance" refer to the rate at which the processor core 106 processes information, and is related to the clock signal frequency. Although sustaining a high processing load is desirable for quality-of-service purposes, at a sustained high processing load the processor core 106 may undesirably generate excess thermal energy, which could harm the processor core 106 or cause other undesirable effects. The PCD 100 may be of any type, including, for example, a smartphone, a laptop, palmtop or tablet computer, portable game console, automotive PCD, etc.

The power controller 104 may supply power (i.e., a power input) to the subsystem 102 via a supply voltage rail 112. The term "supply voltage rail" refers to a network of one or more electrical conductors (not separately shown) that distribute power at a voltage determined by the power controller 104 to one or more devices that consume power. As described below, in some exemplary embodiments the subsystem 102 and power controller 104 may be included in separate integrated circuit chips (not shown), and the supply voltage rail 112 may distribute power from one chip to the other. The term "power management integrated circuit" or "PMIC" may be used to refer to an example of such a power controller chip.

The power controller 104 and the subsystem 102 may communicate with each other via a data communication bus 114. An example of the data communication bus 114 is the System Power Management Interface ("SPMI") bus promulgated by the Mobile Industry Process Interface Alliance. As understood by one of ordinary skill in the art, an SPMI bus is a bi-directional serial bus used for communicating messages relating to real-time control of operating frequencies and voltages of processors.

In a conventional system (not shown), a power controller may detect an over-current condition on a voltage rail. That is, the power controller may monitor current on the voltage rail and detect that a subsystem is drawing an amount of current that exceeds a limit or threshold. If the current on the voltage rail exceeds a limit or threshold for a threshold amount or interval of time, then this may be referred to as an over-current condition. An over-current condition may be indicative of excess thermal energy generation or power consumption exceeding the regulator limit. A conventional power controller may alert the subsystem of the over-current condition via an SPMI bus. In response to the alert, the subsystem may reduce its processing load by applying a power or thermal mitigation method, such as reducing the clock frequency at which one or more processing cores are operating.

Because increased thermal energy production generally lags behind the increased current, a processing core or a power regulator may tolerate (i.e., without sustaining harmful effects) a high processing load associated with an over-current condition for a period of time before thermal mitigation must be applied. This period of time may be referred to as a "current limit extension" or "CLX" window. Maintaining a high processing load during the CLX window is desirable for performance (e.g., quality-of-service) purposes. Applying thermal mitigation before the CLX window ends may fail to take advantage of the additional amount of performance afforded by the remainder of the CLX window. Applying thermal mitigation after the CLX window ends may lead to excess thermal energy to cause harmful effects. Nevertheless, the SPMI bus introduces various latencies. Some of these latencies may be unpredictable, such as the amount of time between the power controller sending the above-described alert message via the SPMI bus and the subsystem receiving and acting upon the alert message. When the subsystem receives the alert message much earlier than when the CLX window ends, thermal mitigation may be applied too early. When the subsystem receives the alert message later than when the CLX window ends, thermal mitigation may be applied too late. The exemplary embodiments described herein address this potential problem in the following manner.

The power controller 104 is configured so that when it detects an over-current condition on the supply voltage rail 112, the power controller 104 modulates the voltage on the supply voltage rail 112 with a modulation signal. The modulation signal may be any signal that is readily distinguishable from voltage droop or other transient fluctuations on the supply voltage rail 112. For example, the modulation signal may be a low voltage pulse of a duration substantially longer than a common voltage fluctuation. The compensation circuitry 108 may be configured to detect this modulation signal. The compensation circuitry 108 may also be configured to compensate for the effect of the modulation signal on the voltage supplied to the processing core 106. An example of compensation is described below. The limits management circuitry 110 is configured to control reduction of the processing load of the processing core 106 in response to the detection of the modulation signal by the compensation circuitry 108. An example of controlling the reduction of the processing load is described below.

Figure 2:
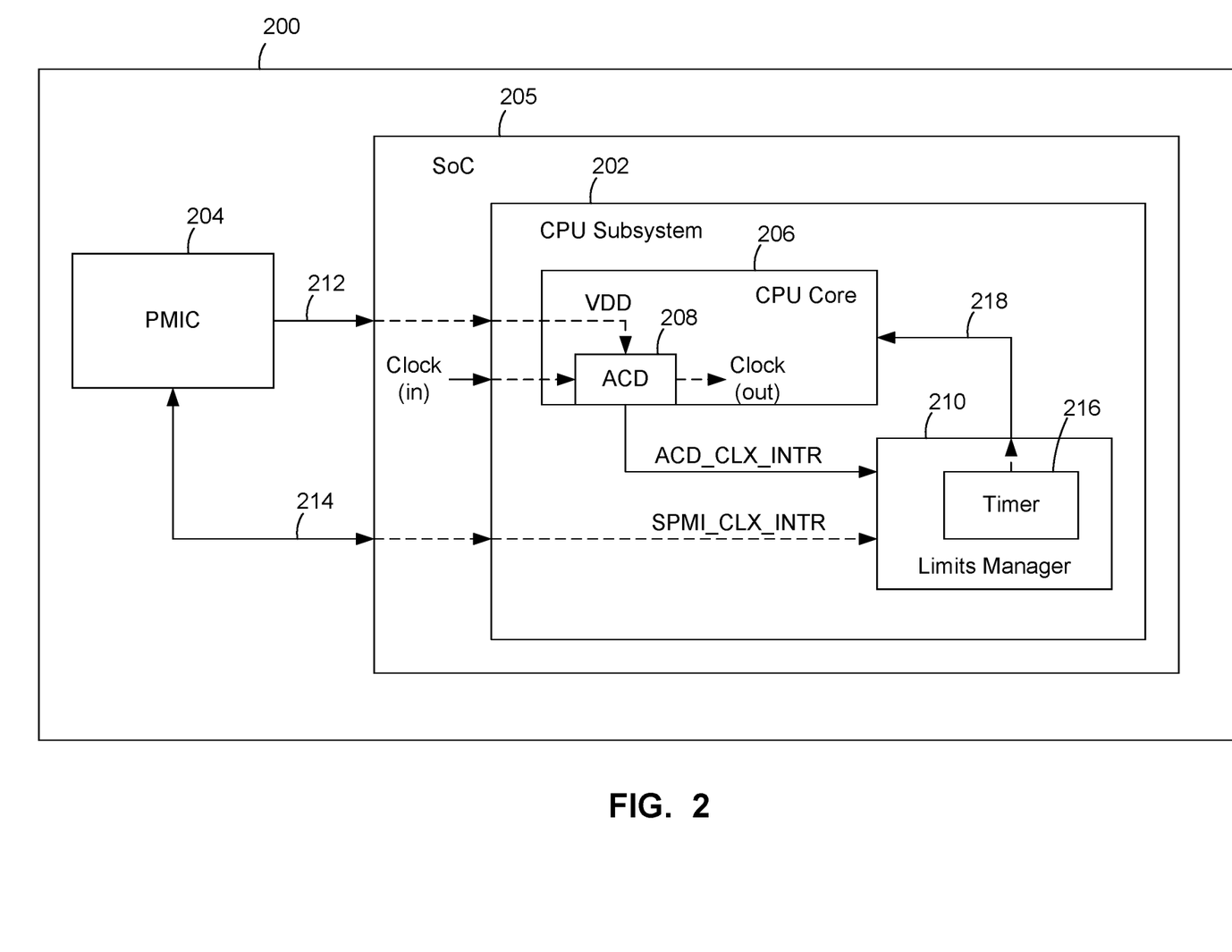
FIG. 2 is a block diagram illustrating another system for power control in a PCD subsystem, in accordance with exemplary embodiments.

As illustrated in FIG. 2, a PCD 200 may include a subsystem 202 and a PMIC 204. The PCD 200 may be an example of the above-described PCD 100 (FIG. 1). The PMIC 204 may be an example of the above-described power controller 104 (FIG. 1). The subsystem 202 may be included in a system-on-a-chip ("SoC") 205 along with other subsystems (not shown). The subsystem 202 may be, for example, a CPU subsystem. Accordingly, the subsystem 202 may include a CPU core 206. The CPU core 206 may include adaptive clock distribution ("ACD") circuitry 208. The ACD circuitry 208 may be an example of the above-described compensation circuitry 108 (FIG. 1).

The subsystem 202 may also include a limits manager 210. The limits manager 210 may be an example of the above-described limits management circuitry 110 (FIG. 1).

The PMIC 204 may supply power to the SoC 205 and thus to its subsystem 202 via a supply voltage rail 212. The PMIC 204 and the subsystem 202 may communicate with each other via an SPMI bus 214. The depiction in FIG. 2 of portions of signal paths, buses, etc., in broken line is intended to indicate that associated voltages, communications, or other signals may be conveyed between the depicted elements as part of the distribution of such signals among any number of elements in the SoC 205, conveyed via any number of intermediary elements, transformed between various forms, etc. The ACD 208 is an example of one such element in the SoC 205 to which a supply voltage ("VDD") conveyed by the supply voltage rail 212 is distributed, and the limits manager 210 is an example of one such element in the SoC 205 with which communications may be conducted via the SPMI bus 214.

One function of the ACD 208 may be to compensate for voltage droop, which is an undesirable effect that may occur in the supply voltage VDD. In the SoC 205 clock generation circuitry (not shown), which may comprise, for example, a crystal oscillator, may generate one or more clock signals. Operation of the CPU core 206, among other elements of the SoC 205, may be based upon one or more of these clock signals. The ACD 208 may control the distribution of such a clock signal to various logic elements (not separately shown) of the CPU core 206. As described in further detail below, the ACD 208 may control the clock signal distribution by adjusting the frequency of the clock signal distributed to elements of the CPU core 206 in relation to a change in the supply voltage VDD. For example, in response to a decrease or reduction in the supply voltage VDD below a nominal level or value due to voltage droop, the ACD 208 may proportionally reduce an operating frequency of a clock signal distributed to elements of the CPU core 206. Reducing the operating frequency of a clock signal distributed to elements of the CPU core 206 in relation to a change in the supply voltage VDD may help maintain timing margins in logic paths (not shown) in the CPU core 206. The ACD 208 may adjust the clock signal frequency to track changes in the supply voltage VDD. Thus, as the voltage droop subsides (i.e., the supply voltage VDD increases back toward the nominal level), the ACD 208 may proportionally increase the clock signal frequency back toward the nominal clock frequency.

Another function of the ACD 208 may be to detect a modulation signal in the supply voltage VDD provided by the PMIC 204. When the PMIC 204 detects an over-current condition on the supply voltage rail 212, the PMIC 204 may modulate the supply voltage VDD with a modulation signal. The modulation signal may be, for example, a low pulse having a duration distinguishable from transient voltage droop. In an exemplary embodiment, the modulation signal may have a duration of 2 microseconds (μs). Nevertheless, in other embodiments the PMIC 204 may modulate the supply voltage VDD with any other modulation signal having a characteristic that is distinguishable from voltage droop. When the ACD 208 detects the modulation signal, the ACD 208 may send an interrupt ("ACD_CLX_INTR") or similar alert signal to the limits manager 210.

Note that in response to the above-described low pulse in the supply voltage VDD, the ACD 208 may reduce the operating frequency of the above-described clock signal. That is, the ACD 208 may compensate for the low pulse in the supply voltage VDD in the same manner in which the ACD 208 may compensate for voltage droop in the supply voltage VDD. As a result of the compensation function of the ACD 208, the low pulse does not affect the operation of the CPU core 206 except to the extent the CPU core 206 may operate at a lower clock frequency for the duration of the low pulse.

In the exemplary embodiment shown in FIG. 2, when the PMIC 204 detects an over-current condition on the supply voltage rail 212, the PMIC 204 may not only modulate the supply voltage VDD with the modulation signal but may also send an interrupt ("SPMI_CLX_INTR") to the CPU subsystem 202 via the SPMI bus 214. The limits manager 210 may receive not only the ACD_CLX_INTR from the ACD 208 but also the SPMI_CLX_INTR from the PMIC 204. It may be noted that due to various latencies the SPMI_CLX_INTR may not be received by the limits manager 210 until sometime after the ACD 208 has detected the modulation signal in the supply voltage VDD and sent the ACD_CLX_INTR to the limits manager 210. That is, it is contemplated that in some examples of operation the ACD_CLX_INTR will arrive at the limits manager 210 before the SPMI_CLX_INTR arrives at the limits manager 210.

Although in the exemplary embodiment shown in FIG. 2 the limits manager 210 may be configured to receive both the ACD_CLX_INTR from the ACD 208 and the SPMI_CLX_INTR from the PMIC 204, in other embodiments such a limits manager may be configured to receive only an interrupt (or similar alert) from an ACD or other such compensation circuitry. In such other embodiments, a PMIC or other such power controller may not send an interrupt at all when an over-current condition is detected, but rather may only modulate the supply voltage VDD with the modulation signal.

The limits manager 210 may include a timer 216. In response to receiving the ACD_CLX_INTR, the limits manager 210 may start timing a predetermined time interval using the timer 216. When the timer 216 indicates that the time interval has elapsed, the limits manager 210 may send an alert 218 to the CPU core 206. This alert 218 may have any form, such as, for example, an interrupt, a message via a bus, etc. The alert 218 indicates to the CPU core 206 that the above-described CLX window is ending and that the CPU core 206 may begin thermal mitigation. In an example in which the CLX window is 100 μs, and the modulation signal (low pulse) has a duration of 2 μs, then the above-referenced predetermined time interval may be 98 μs (i.e., 100 μs-2 μs). In this manner, the CPU core 206 may begin thermal mitigation when the CLX window ends, i.e., neither substantially earlier nor substantially later than the end of the 100 μs CLX window that begins when the PMIC 204 detects an over-current condition on the supply voltage rail 212.

In an alternative embodiment, the limits manager 210 may use receipt of the SPMI_CLX_INTR as an additional condition. For example, when the timer 216 indicates that the time interval has elapsed, the limits manager 210 may defer sending the alert 218 to the CPU core 206 until such time as the limits manager 210 may receive the SPMI_CLX_ INTR. That is, in such an embodiment, the alert 218 may be additionally conditioned on receipt of the SPMI_CLX_ INTR. The additional condition may be employed in an embodiment in which, for example, the PMIC 204 is configured to refrain from sending the SPMI_CLX_INTR after detecting an over-current condition if the over-current condition quickly resolves.

In response to the alert 218, the CPU core 206 may reduce its processing load so that, for example, thermal energy production is reduced. The CPU core 206 may, for example, activate clock divider circuitry (not shown) in the CPU subsystem 202 that reduces the frequency of the clock signal on which the CPU core 206 operates.

Figure 3:
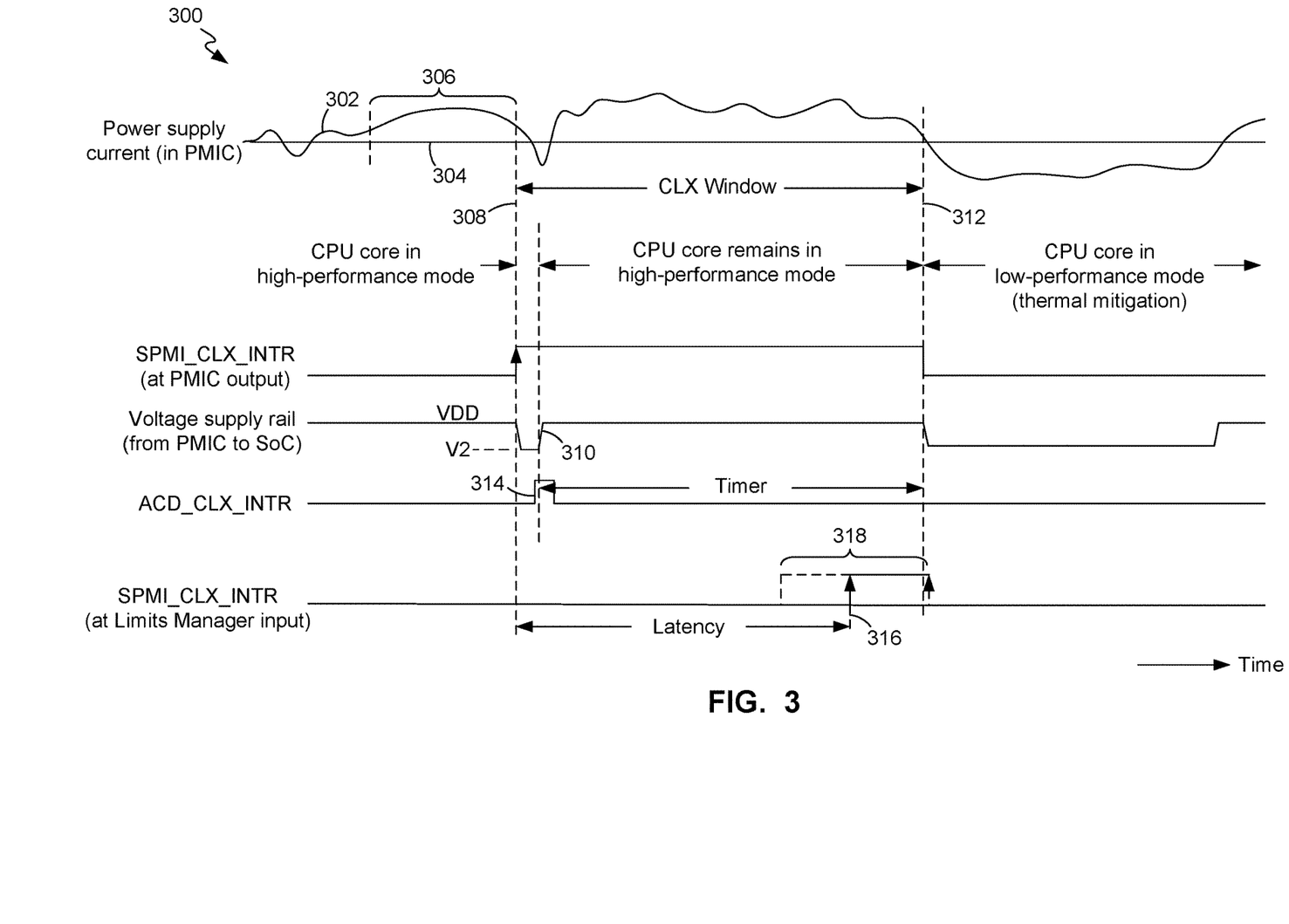
FIG. 3 is a timing diagram illustrating aspects of an example of operation of the system of FIG. 2, in accordance with exemplary embodiments.

In FIG. 3, a timing diagram 300 illustrates timing relationships among the above-described elements in an example of operation. Initially, the CPU core 206 (FIG. 2) may be operating in a high-performance mode, in which the clock signal (not shown) has a nominal or "high" frequency, and the voltage (not shown) on the supply voltage rail 212 (FIG. 2) is stable at a nominal level or value. Then, the PMIC 204 (FIG. 2) may detect an over-current condition on the supply voltage rail 212 (FIG. 2). The PMIC 204 may detect an over-current condition based on, for example, a change in the current 302 on the supply voltage rail 212 during a moving filter window 306.

When the PMIC 204 (FIG. 2) detects an over-current condition, the PMIC 204 may generate the above-described SPMI_CLX_INTR, indicated in FIG. 3 at a time 308. As also indicated at that time 308, the PMIC 204 may modulate the supply voltage rail 212 (FIG. 2) with a low pulse 310. The low pulse 310 may be characterized by a decrease from the nominal value of the supply voltage VDD to a lower voltage V2 for a predetermined duration, such as, the 2 μs duration in the above-described example.

Following the low pulse 310, the PMIC 204 may continue to maintain the supply voltage rail 212 at the nominal value of the supply voltage VDD for the remainder of the CLX window, which is depicted in FIG. 3 ending at a time 312. Accordingly, the CPU core 206 (FIG. 2) may continue to operate in a high-performance mode, i.e., the same processing load as before the over-current condition was detected.

In response to the low pulse 310, the ACD 208 (FIG. 2) may generate the above-described ACD_CLX_INTR. An example of a manner in which the ACD 208 may operate to detect the low pulse 310, i.e., to distinguish the low pulse 310 from a potential voltage droop, is described below. Note that in an example in which the low pulse 310 has a duration of 2 μs, the ACD 208 would take approximately 2 μs to detect the low pulse 310. The ACD_CLX_INTR may be in the form of, for example, a high pulse 314 beginning prior to the time that the low pulse 310 rises to the target VDD.

In response to the ACD_CLX_INTR (e.g., the high pulse 314), the limits manager 210 (FIG. 2) may time the remainder of the CLX window. For example, the remainder of the CLX window is 98 μs in an example in which the entire CLX window is 100 μs and the low pulse 310 is 2 μs. The limits manager 210 may utilize the timer 216 (FIG. 2) to time the remainder of the CLX window and thus determine when the CLX window ends.

When the CLX window ends (at the time 312 in the illustrated example), the limits manager 210 may send an alert (not shown in FIG. 3) to the CPU core 206 (FIG. 2). In response to the alert, the CPU core 206 may switch from the high-performance mode (or high processing load) to a low-performance mode (or low processing load) by reducing the frequency of the clock signal (not shown) on which the CPU core 206 operates to a "low" frequency (lower than the nominal or "high" frequency).

Note that due to SPMI bus and other latencies, the assertion of the SPMI_CLX_INTR at the time 308 does not result in the limits manager 210 (FIG. 2) receiving a corresponding signal until a later time 316. That is, the modulation signal (i.e., the low pulse 310 in the illustrated embodiment) arrives at the ACD 208 (FIG. 2) substantially earlier than the SPMI_CLX_INTR arrives at the limits manager 210. As a result, the ACD 208 may generate the ACD_CLX_INTR substantially earlier than when the SPMI_CLX_INTR arrives at the limits manager 210 at the time 316. Any delay between the modulation signal and the ACD_CLX_INTR is insubstantial compared with the amount of delay common in SPMI bus communications. Also note that the time 316 is only an example, and the signal corresponding to assertion of the SPMI_CLX_INTR could arrive at the limits manager 210 at any time during a window 318, i.e., earlier than the end of the CLX window or later than the end of the CLX window.

Figure 4:
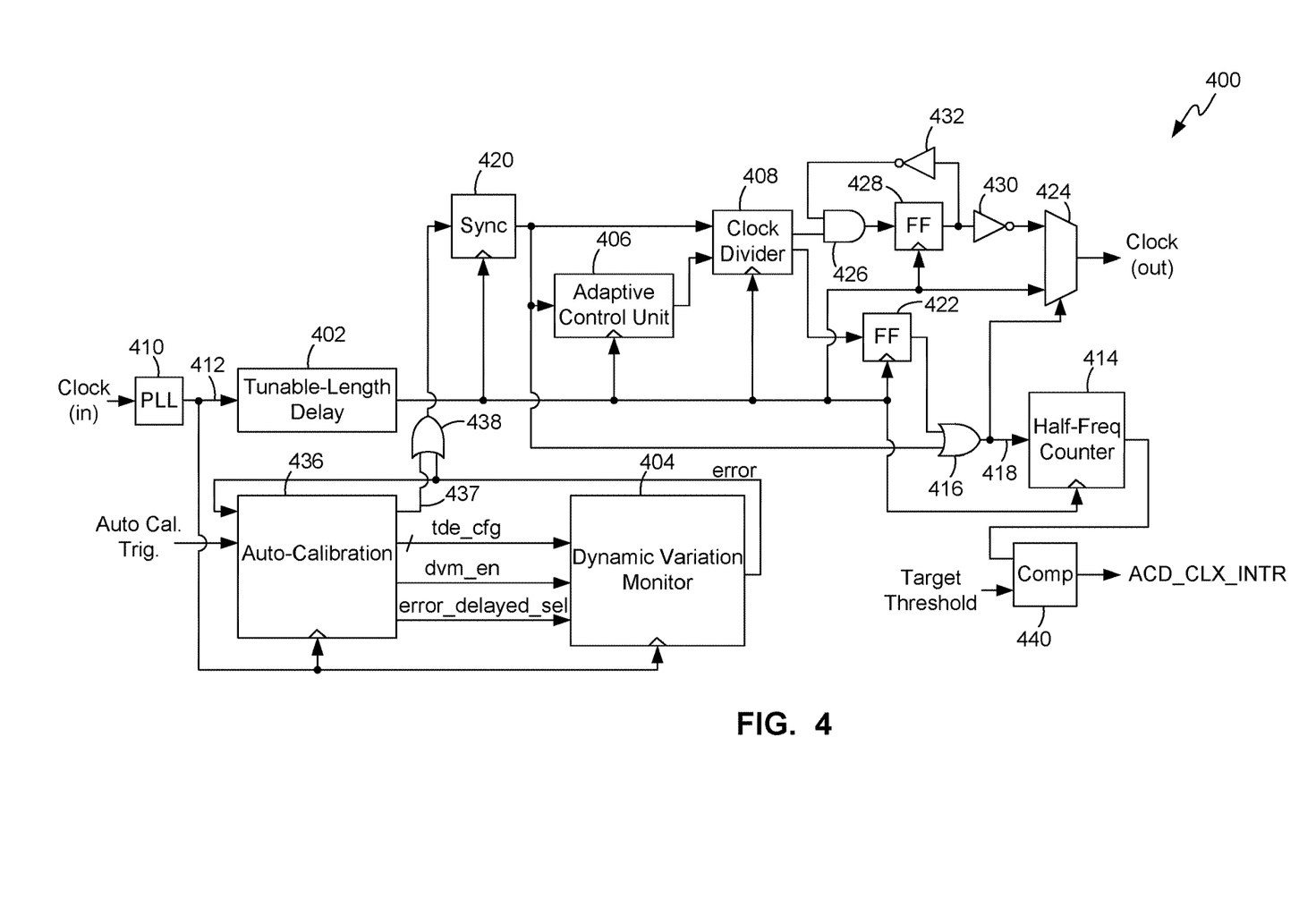
FIG. 4 is a block diagram of adaptive clock distribution circuitry, in accordance with exemplary embodiments.

In FIG. 4, an ACD 400, which may be an example of the above-described ACD 208 (FIG. 2), is illustrated. The ACD 400 may include a tunable-length delay ("TLD") 402, a dynamic variation monitor ("DVM") 404, an adaptive control unit ("ACU") 406, and a clock divider 408. Although not shown for purposes of clarity, the TLD 402, DVM 404, ACU 406, and clock divider 408 may operate based on the supply voltage VDD. A phase-locked loop ("PLL") 410 may receive an input clock signal and produce a root clock signal 412. The TLD 402 and DVM 404 may receive the root clock signal 412. The DVM 404 may detect the onset of voltage droop in the supply voltage VDD. Since voltage droops may occur quickly, the TLD 402 exploits the clock-data delay compensation in processor paths during a supply voltage droop. The TLD 402 protects the processor path timing margin (i.e., clock period minus datapath delay) for multiple cycles after the droop occurs to provide a response time to detect the droop with the DVM 404 and adaptively change the clock frequency to a lower value.

Figure 5:
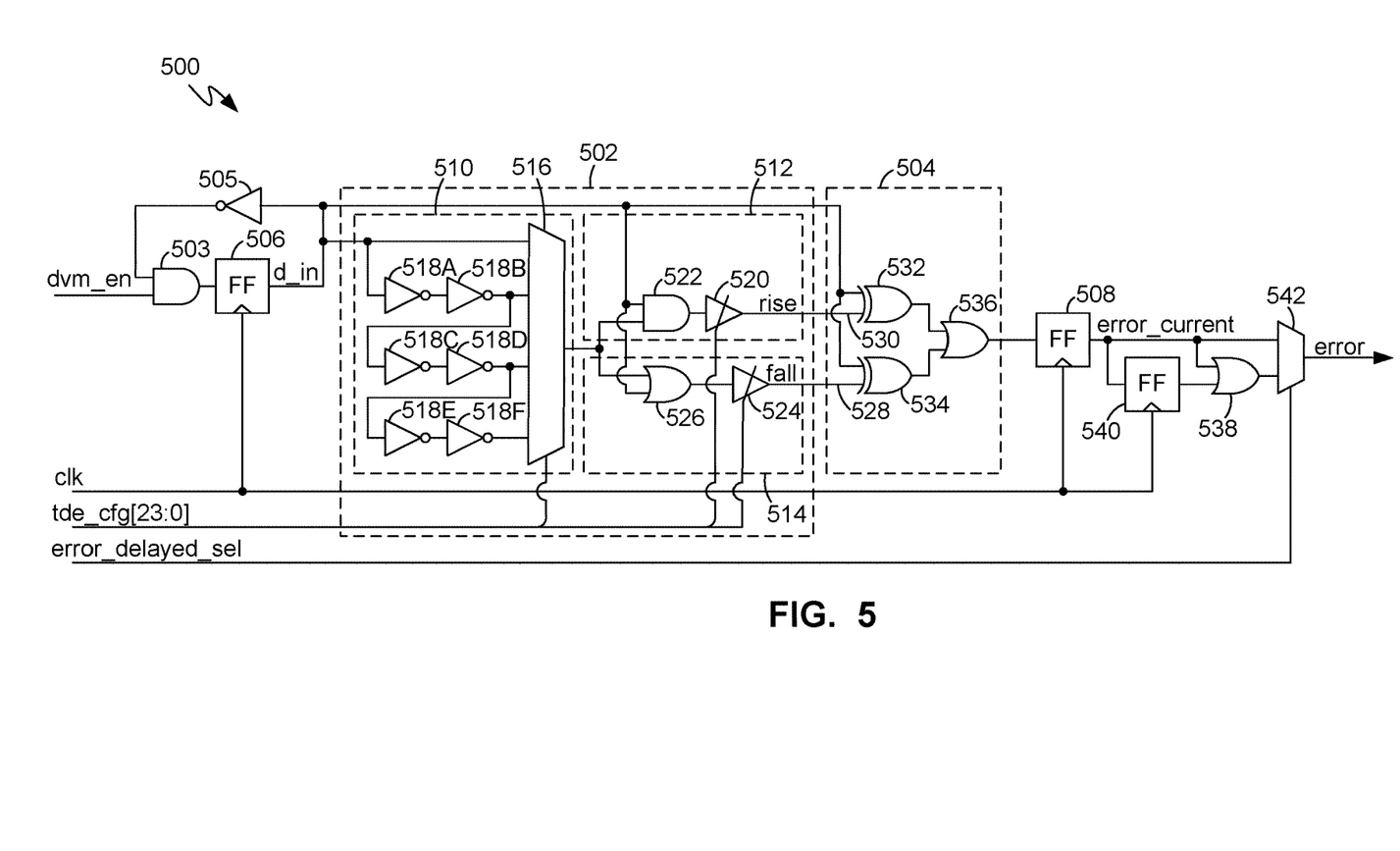
FIG. 5 is a block diagram of a portion of the adaptive clock distribution circuitry of FIG. 4, in accordance with exemplary embodiments.

In FIG. 5, a DVM 500, which may be an example of the above-described DVM 404 (FIG. 4) is illustrated. The DVM 500 may be a path-based timing-margin detector, which may comprise a tunable-delay element ("TDE") 502 and error-checking logic 504 between driving and receiving flip-flops ("FF"s) 506 and 508, respectively. The DVM 500 may continuously measure the impact of supply voltage changes on timing margin each cycle. The DVM 500 is enabled by asserting a DVM enable signal "dvm_en," which is one input of a 2-input AND gate 503. The driving FF 506 output, which is the input signal ("d_in") to the TDE 502, is also the input to inverter 505 to drive the inverted d_in as the other input to the AND gate 503. When dvm_en is high, the combination of the FF 506, the inverter 505, and the AND gate 503 toggles d_in every cycle. When dvm_en is low, d_in is low every clock cycle. The TDE 502 may receive a control or configuration signal "tde_cfg," which in the illustrated embodiment consists of a 24-bit word tde_cfg [23:0]. The TDE 502 has three tunable sections or components: (i) a common TDE component 510 that affects both rising and falling d_in transitions as controlled by tde_cfg [23:16]; (ii) a TDE component 512 for rising d_in transitions only, as controlled by tde_cfg[7:0]; and (iii) a TDE component 514 for falling d_in transitions only, as controlled by tde_cfg[15:8].

The common TDE component 510 (i.e., common to both rising and falling d_in transitions) contributes a selectable or configurable delay to all rising and falling transitions of d_in, selectable via a multiplexer ("MUX") 516 controlled by tde_cfg[23:16]. The delay thus provided to d_in by the common TDE component 510 may be selected to be one of $2^x$ unit delay times, where x equals the number of TDE configuration signals which equals 8 in the illustrated embodiment (i.e., bits 23 to 16). Thus, the TDE component 510 allows $2^8$ or 256 unique unit delay times. In the illustrated embodiment, each unit delay time may equal two inverter delays. As an example, the least significant two bits of the TDE 510 configuration signal tde_cfg[17:16] may select a delay of: six inverter delays or three unit delay times, consisting of the amount of delay provided by the inverters 518A-518F with tde_cfg[17:16]=11; two unit delay times, consisting of the amount of delay provided by only the inverters 518A, 518B, 518C and 518D with tde_cfg[17:16]= 10; one unit delay time, consisting of the amount of delay provided by only the inverters 518A and 518B with tde_cfg [17:16]=01; or zero unit delay times, wherein all six inverters 518A-518F are bypassed with tde_cfg[17:16]=00.

The TDE component 512 contributes a selectable or configurable delay to rising transitions of d_in. The TDE component 512 includes a controllable delay line 520 controlled by tde_cfg[7:0]. The signal provided to the controllable delay line 520 is the delayed d_in (i.e., the output of the MUX 516) logically AND'ed with d_in (via an AND gate 522). The TDE component 514 contributes a selectable or configurable delay to falling transitions of d_in. The TDE component 514 includes a controllable delay line 524 controlled by tde_fg[15:8]. The signal provided to the controllable delay line 524 is the delayed d_in (i.e., the output of the MUX 516) logically OR'ed with d_in (via an OR gate 526).

Note that the delay of the common TDE component 510 is much longer than the delay of the other two TDE components 512 or 514. These two separate TDE components 512 and 514 are used to calibrate a nearly equal datapath delay for d_in rising and falling transitions as well as to provide a finer delay resolution for the DVM timing margin. For a cycle with a rising d_in transition, the d_in signal quickly propagates through the OR gate 526 and the controllable delay line 524 to transition a "fall" node 528 high. The rising d_in transition also propagates through the common TDE component 510, with the output of the MUX 516 driving one input of the AND gate 522 to a high value while the other input of the AND gate 522 is high, as controlled by d_in. The output of the AND gate 522, which is the input to the controllable delay line 520, drives a "rise" node 530 high. Conversely, for a cycle with a falling d_in transition, the d_in signal quickly propagates through the AND gate 522 and the controllable delay line 520 to transition the "rise" node 530 low. The falling d_in transition also propagates through the common TDE component 510, with the output of the MUX 516 driving one input of the OR gate 526 to a low value while the other input of the OR gate 526 is low, as controlled by d_in. The OR gate 526 drives the TDE component 514 to lower the "fall" node 528 to a low value.

The error-checking logic 504 includes two exclusive-OR ("XOR") gates 532 and 534. The XOR gate 532 compares the value of the "rise" node 530 with the value of d_in. The XOR gate 534 compares the value of the "fall" node 528 with the value of d_in. An OR gate 536 receives the outputs of the XOR gates 532 and 534 and drives the input of the receiving FF 508 to generate the current error ("error_current") as the output of the receiving FF 508 on the next cycle. When both the "rise" node 530 and the fall node 528 are logically equal to d_in, then the output of the error-checking logic 504 is low. Otherwise, the output of the error-checking logic 504 is high. Thus, the DVM datapath delay for a rising d_in transition is through the "rise" node 530 and error-checking logic 504, while the path through the "fall" node 528 is guaranteed to satisfy timing. The DVM datapath delay for a falling d_in transition is through the "fall" node 528 and error-checking logic 504, while the path through the "rise" node 530 is ensured to meet timing. If error_current is low, then the DVM timing margin is satisfied. If error_current is high, then the DVM timing margin is negative (i.e., DVM datapath delay is greater than the clock period), which is a timing violation.

Since a late path delay could induce metastability on the output ("error_current") of the receiving FF 508, the DVM 500 may include a mode to generate the error signal as a logical-OR (via an OR gate 538) of the error_current (in the present cycle) and the error_current in the previous cycle (via a FF 540) to increase the probability of sampling an error during a metastable condition. The mode may be controlled or selected based on the setting of an "error_delayed_sel" selection signal, which controls a MUX 542. That is, depending upon the value of error_delayed_sel, the MUX 542 selects either the error current (in the present cycle) or the output of the OR gate 538 as the output ("error") of the DVM 500.

Returning to FIG. 4, an auto-calibration circuit 436 may calibrate the delays of the DVM 404 (e.g., provided by the TDE components 510, 512 and 514 of the DVM 500 described above with regard to FIG. 5) for target nominal values of supply voltage VDD and clock frequency (FCLK). During the DVM calibration, the auto-calibration circuit 436 controls the DVM enable signal dvm_en, the configuration signal tde_cfg[23:0] and the error_delayed_sel signals (described above with regard to FIG. 5) while receiving the DVM 404 error signal output (the "error" signal in FIG. 5). Since the DVM 404 cannot detect supply voltage droops during calibration, the auto-calibration circuit 436 asserts a DVM calibration in-progress signal 437 to reduce the processor clock frequency to a lower value while the DVM 404 and auto-calibration circuit 436 operate on the nominal FCLK value via the root clock 412 during the DVM calibration. The auto-calibration circuit 436 monitors the DVM output error signal ("error") to program the TDE configuration bits (tde_cfg[23:0]). During normal operation of the ACD 400, while the supply voltage operates at nominal conditions (i.e., at the nominal value), the DVM 404 timing margin remains positive (i.e., error is low). If the supply voltage sufficiently decreases, the DVM 404 timing margin is violated (i.e., clock period<datapath delay). As a result of the DVM timing-margin violation, the "error" signal output of the DVM 404 transitions high, indicating an error. The DVM output error drives one input of a 2-input OR gate 438 high and thus drives the output of the OR gate 438 high and the input of a synchronizer 420 high. (The other input of the OR gate 438 is the DVM calibration in-progress signal 437, which is always low during normal operation of the ACD 400.) After two rising clock edges from the TLD 402 output, the output of the synchronizer 420 transitions high to reduce the clock frequency to the processor during the droop to avoid processor path timing-margin violations.

The ACU 406 and clock divider 408 reduce the clock frequency from the nominal FCLK value to a "lower" FCLK value beginning when the output of the synchronizer 420 transitions logically high, resulting from the DVM 404 detection of the onset of voltage droop in the supply voltage VDD. The lower FCLK value may be, for example, one half the nominal FCLK value. The ACU 406 determines how long to operate at the lower FCLK value after a supply voltage decrease event (e.g., droop) occurs. For example, a supply voltage droop may oscillate between low and high values. Once a supply voltage droop is detected by the DVM 404, the ACU 406 maintains the lower FCLK until the supply voltage settles back to the nominal value. This is performed by maintaining the lower FCLK until the DVM error signal remains low for a predetermined number (e.g., 100) of clock cycles. The predetermined number of clock cycles may be programmable in a register (not shown) in the ACU 406. Once this happens, then the ACU 406 initiates the transition from the lower FCLK to the nominal FCLK value.

The ACD 400 may further include a half-frequency counter 414, which may be initialized to zero (i.e., before voltage droop is detected), and may count at the frequency of the root clock signal 412 while voltage droop is occurring. The output of an OR-gate 416 may provide a select signal 418 that enables the half-frequency counter 414 to count. The half-frequency counter 414 operates on the output of the TLD 402, which operates at the nominal FCLK value or the same FCLK value as the PLL 410 output (root clock signal 412). Thus, the half-frequency counter 414 counts the number of cycles at the nominal FCLK value in which the ACD 400 operates at half the frequency of the nominal FCLK value.

One of the two inputs of the OR-gate 416 may be provided by the synchronizer 420. The synchronizer 420 synchronizes the DVM 404 error output signal ("error") to the TLD 402 output clock domain. The DVM 404 operates on the root clock signal 412, while the ACU 406 and clock divider 408 operate on the TLD 402 output (clock) signal. Although the frequencies of the root clock signal 412 and the TLD output clock signal may be equal, these clock signals are not inherently synchronized. The other input of the OR-gate 416 may be provided by the output of a FF 422, which is controlled by the clock divider 408. The circuitry comprising the OR-gate 416, the FF 422 and the synchronizer 420 ensures that the select signal 418, which operates a 2-input MUX 424, does not create a glitch on the output of the MUX 424. One input of the MUX 424 may receive the output (i.e., clock signal) of the TLD 402. The other input of the MUX 424 may receive a clock signal to generate a divided clock signal operating at half the frequency of the TLD 402 output clock signal. The divided clock signal is generated from a FF 428, an inverter 432, and an AND gate 426. The clock divider 408 drives one input to the AND gate 426, which may be referred as the clock divider enable signal. When the clock divider enable signal is high, the FF 428 behaves as a toggle FF, where the output of the FF 428 is inverted by the inverter 432 to drive the input to the AND gate 426 to provide the input to the FF 428. The FF 428, behaving as a toggle FF, generates the half-frequency signal. Prior to a supply voltage decrease event (i.e., either supply voltage droop or the low pulse 310 (FIG. 3)), the clock divider enable signal is low, resulting in a low input to the FF 428 and a low output from the FF 428. In this condition, an inverter 430 drives a high value to the MUX 424 input. When the DVM 404 detects a sufficiently low supply voltage, the DVM 404 output signal transitions high, which is synchronized to the TLD 402 output clock domain via the synchronizer 420. Once the output of the synchronizer 420 transitions high, both the TLD 402 output clock signal and the inverter 430 output signal are high. The synchronizer 420 output transitions the OR gate 416 output high to change the MUX 424 select signal 418 from low to high. Thus, the signal driving the MUX 424 output changes from the TLD 402 output clock signal to the inverter 430 output signal. Since the MUX 424 select signal 418 transitions while the MUX 424 inputs are high, no glitch occurs on the MUX 424 output. In addition, the synchronizer 420 output transitions the clock divider enable signal high and transitions the FF 422 input signal high. In subsequent clock cycles, the FF 428 output toggles each cycle to generate the half frequency signal at the inverter 430 output. Moreover, the FF 422 output remains high to keep the MUX 424 select signal 418 high while operating at half frequency. The ACU 406 maintains the high value for the clock divider enable signal and the high value for the FF 422 input until transitioning back to the target FCLK.

The output of the half-frequency counter 414 is provided to one input of a comparator 440. The other input of the comparator 440 receives a target threshold, which is a value representing a threshold number of clock cycles that characterizes the low pulse 310 (FIG. 3). The output of the comparator is the above-described ACD_CLX_INTR. In an example in which the low pulse 310 has a duration of 2 μs, and the nominal FCLK is 1 GHz, the target threshold may be 2 μs*FCLK or 2000. In this example, when the count that is the output of the half-frequency counter 414 reaches 2000, the ACD_CLX_INTR is asserted.

Figure 6:
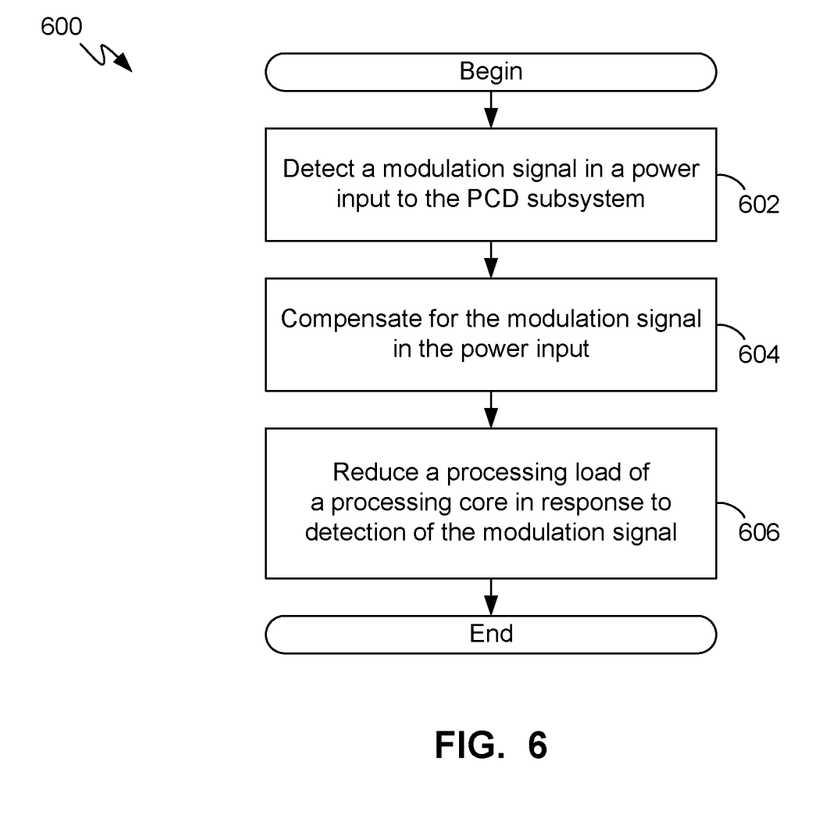
FIG. 6 is a flow diagram illustrating a method for power control in a PCD subsystem, in accordance with exemplary embodiments.

In FIG. 6, a method 600 for power control in a subsystem of a PCD is depicted in flow diagram form. As indicated by block 602, the method 600 may include detecting a modulation signal in a power input to the subsystem. As indicated by block 604, the method 600 may also include compensating for the modulation signal in the power input. As further indicated by block 606, the method 600 may further include reducing a processing load of a processing core in response to detection of the modulation signal.

Figure 7:
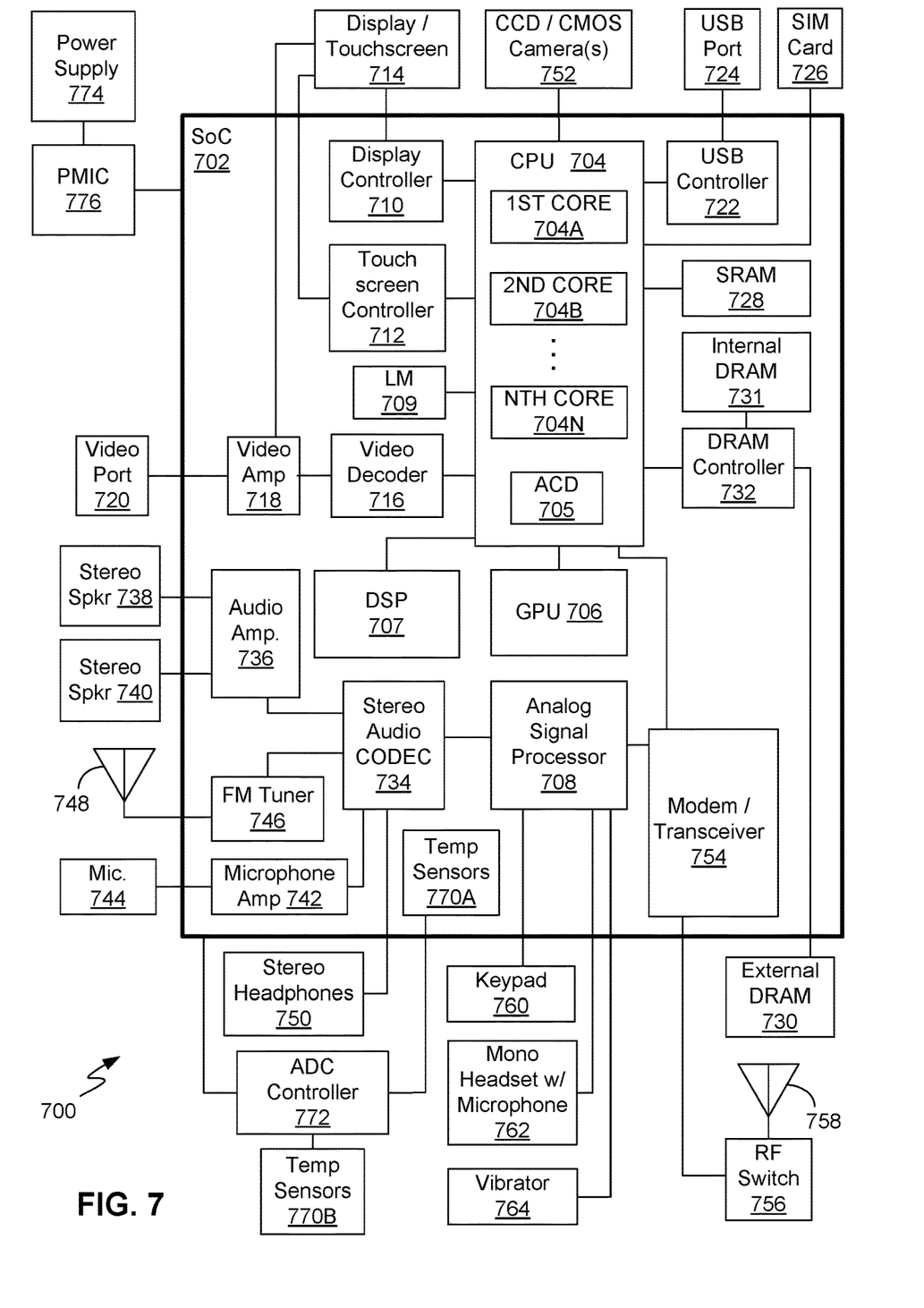
FIG. 7 is a block diagram of a PCD, in accordance with exemplary embodiments.

In FIG. 7, an example of a PCD in which exemplary embodiments of systems and methods for subsystem power control may be provided is illustrated. For purposes of clarity, some data buses, clock signals, power supply voltages, etc., are not shown.

The PCD 700 may include an SoC 702. The SoC 702 may include a CPU (subsystem) 704, a GPU 706, a DSP 707, an analog signal processor 708, or other processors. The CPU 704 may include one or more CPU cores, such as a first CPU core 704A, a second CPU core 704B, etc., through an Nth CPU core 704N. The CPU 704 may include ACD circuitry 705. The ACD circuitry 705 may be associated with one or more of the CPU cores 704A-704N. A limits manager 709 may be coupled to the CPU 704.

A display controller 710 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus ("USB") controller 722 may also be coupled to CPU 704, and a USB port 724 may be coupled to the USB controller 722. A subscriber identity module ("SIM") card 726 may also be coupled to the CPU 704.

One or more memories may be coupled to the CPU 704. The one or more memories may include both volatile and non-volatile memories. Examples of volatile memories include static random access memory ("SRAM") 728 and dynamic RAMs ("DRAM"s) 730 and 731. Such memories may be external to the SoC 702, such as the DRAM 730, or internal to the SoC 702, such as the DRAM 731. A DRAM controller 732 coupled to the CPU 704 may control the writing of data to, and reading of data from, the DRAMs 730 and 731. In other embodiments, such a DRAM controller may be included within a processor, such as the CPU 704.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

A modem or RF transceiver 754 may be coupled to the analog signal processor 708 and the CPU 704. An RF switch 756 may be coupled to the RF transceiver 754 and an RF antenna 758. In addition, a keypad 760, a mono headset with a microphone 762, and a vibrator device 764 may be coupled to the analog signal processor 708.

The SoC 702 may have one or more internal or on-chip thermal sensors 770A and may be coupled to one or more external or off-chip thermal sensors 770B. An analog-to-digital converter ("ADC") controller 772 may convert voltage drops produced by the thermal sensors 770A and 770B to digital signals. A power supply 774 and a PMIC 776 may supply power to the SoC 702.

Firmware or software may be stored in any of the above-described memories, such as DRAM 730 or 731, SRAM 728, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A method for power control in a subsystem of a portable computing device, comprising:
    detecting a modulation signal in a power input to the subsystem; and
    reducing a processing load of a processing core after a time interval in response to detection of the modulation signal.
2. The method of clause 1, wherein detecting the modulation signal comprises detecting the modulation signal in a voltage supply rail received from a power management integrated circuit.
3. The method of clause 1, further comprising:
    determining when the time interval has elapsed, the time interval beginning upon detection of the modulation signal in the power input;
    wherein reducing the processing load in response to detection of the modulation signal comprises reducing the processing load in response to elapse of the time interval.
4. The method of clause 3, wherein reducing the processing load comprises reducing an operating frequency of a clock signal supplied to the processing core in response to elapse of the time interval.
5. The method of clause 1, further comprising compensating in response to the modulation signal in the power input.
6. The method of clause 5, wherein compensating in response to the modulation signal in the power input comprises reducing an operating frequency of a clock signal supplied to the processing core in relation to a voltage reduction of the power input.
7. The method of clause 6, wherein detecting the modulation signal comprises detecting a low voltage pulse.
8. The method of clause 7, wherein reducing the operating frequency of the clock signal comprises reducing the operating frequency of the clock signal during the low voltage pulse and restoring the operating frequency of the clock signal following the low voltage pulse.
9. The method of clause 8, wherein reducing the processing load comprises reducing the operating frequency of the clock signal.
10. A system for power control in a subsystem of a portable computing device, comprising:
    a processing core in the subsystem;
    compensation circuitry configured to detect a modulation signal in a power input to the subsystem; and
    limits management circuitry configured to control reduction of a processing load of the processing core after a time interval in response to detection of the modulation signal.
11. The system of clause 10, wherein the subsystem is included in a system-on-a-chip (SoC), and the power input is an SoC power supply rail coupled to a power management integrated circuit.
12. The system of clause 11, wherein the power management integrated circuit is configured to detect an over-current condition on the SoC power supply rail, and to modulate the SoC supply rail with a modulation signal when the over-current condition is detected.
13. The system of clause 10, wherein:
    the limits management circuitry is configured to time the time interval beginning upon detection of the modulation signal in the power input, and to provide an alert to the processing core when the time interval elapses; and
    the processing core is configured to reduce the processing load in response to the alert.
14. The system of clause 13, wherein the processing core is configured to reduce the processing load in response to the alert by reducing an operating frequency of a clock signal supplied to the processing core.
15. The system of clause 10, wherein the compensation circuitry is further configured to compensate in response to the modulation signal in the power input.
16. The system of clause 15, wherein the compensation circuitry comprises adaptive clock distribution circuitry configured to reduce an operating frequency of a clock signal supplied to the processing core in relation to a voltage reduction of the power input.
17. The system of clause 16, wherein the adaptive clock distribution circuitry is configured to detect the modulation signal by detecting a low voltage pulse.
18. The system of clause 17, wherein the adaptive clock distribution circuitry is configured to reduce the operating frequency of the clock signal during the low voltage pulse and restore the operating frequency of the clock signal following the low voltage pulse.
19. The system of clause 18, wherein:
    the limits management circuitry is configured to control reduction of the processing load by providing an alert to the processing core; and
    the processing core is configured to reduce the processing load in response to the alert.
20. A system for power control in a subsystem of a portable computing device, comprising:
    means for detecting a modulation signal in a power input to the subsystem; and
    means for reducing a processing load of a processing core after a time interval in response to detection of the modulation signal.
21. The system of clause 20, wherein the means for detecting the modulation signal comprises means for detecting the modulation signal in a voltage supply rail received from a power management integrated circuit.

22. The system of clause 20, further comprising:
means for determining when the time interval has elapsed, the time interval beginning upon detection of the modulation signal in the power input;
wherein the means for reducing the processing load in response to detection of the modulation signal comprises means for reducing the processing load in response to elapse of the time interval.

23. The system of clause 22, wherein the means for reducing the processing load comprises means for reducing an operating frequency of a clock signal supplied to the processing core in response to elapse of the time interval.

24. The system of clause 20, further comprising means for compensating in response to the modulation signal in the power input.

25. The system of clause 24, wherein the means for compensating in response to the modulation signal in the power input comprises means for reducing an operating frequency of a clock signal supplied to the processing core in relation to a voltage reduction of the power input.

26. The system of clause 25, wherein the means for detecting the modulation signal comprises means for detecting a low voltage pulse.

27. The system of clause 26, wherein the means for reducing the operating frequency of the clock signal comprises means for reducing the operating frequency of the clock signal during the low voltage pulse and restoring the operating frequency of the clock signal following the low voltage pulse.

28. The system of clause 27, wherein the means for reducing the processing load comprises means for reducing the operating frequency of the clock signal.

29. A system for power control in a portable computing device, comprising:
a power management integrated circuit configured to provide a power supply rail, to detect an over-current condition on the power supply rail, and to modulate the power supply rail with a modulation signal when the over-current condition is detected; and
a system-on-a-chip (SoC) having a subsystem, the subsystem having a power input coupled to the power supply rail, the subsystem comprising:
a processing core;
compensation circuitry configured to detect the modulation signal in the power input; and
limits management circuity configured to alert the processing core to reduce a processing load in response to detection of the modulation signal.

30. The system of clause 29, wherein:
the limits management circuitry is configured to time an interval beginning upon detection of the modulation signal in the power input, and to provide the alert to the processing core when the interval elapses; and
the processing core is configured to reduce the processing load in response to the alert.

31. The system of clause 29, wherein the compensation circuitry is configured to detect the modulation signal by detecting a low voltage pulse.

32. The system of clause 31, wherein the processing core is configured to reduce the processing load by reducing an operating frequency of a clock signal supplied to the processing core.

33. The system of clause 29, wherein the compensation circuitry is further configured to compensate in response to the modulation signal in the power input.

34. The system of clause 33, wherein the compensation circuitry is configured to compensate in response to the modulation signal in the power input by reducing the operating frequency of the clock signal during the low voltage pulse and restoring the operating frequency of the clock signal following the low voltage pulse.

What is claimed is:
1. A method for power control in a subsystem of a portable computing device, comprising:
modulating a signal with a power management integrated circuit in a power input to a subsystem when the power management integrated circuit detects an over-current condition;
detecting the modulation signal in the power input to the subsystem;
determining when a time interval has elapsed, the time interval beginning upon detection of the modulation signal in the power input;
generating an alert when it is determined that the time interval has elapsed; and
reducing a processing load of a processing core after the time interval in response to detection of the alert, wherein reducing the processing load comprises reducing an operating frequency of a clock signal supplied to the processing core.

2. The method of claim 1, wherein detecting the modulation signal comprises detecting the modulation signal in a voltage supply rail received from the power management integrated circuit.

3. The method of claim 1, further comprising compensating in response to the modulation signal in the power input.

4. The method of claim 3, wherein compensating in response to the modulation signal in the power input comprises reducing an operating frequency of a clock signal supplied to the processing core in relation to a voltage reduction of the power input.

5. The method of claim 4, wherein detecting the modulation signal comprises detecting a low voltage pulse.

6. The method of claim 5, wherein reducing the operating frequency of the clock signal comprises reducing the operating frequency of the clock signal during the low voltage pulse and restoring the operating frequency of the clock signal following the low voltage pulse.

7. The method of claim 6, wherein reducing the processing load comprises reducing the operating frequency of the clock signal.

8. A system for power control in a subsystem of a portable computing device, comprising:
a processing core in the subsystem;
a power management integrated circuit is configured to detect an over-current condition on a power input to the subsystem and to modulate a signal on the power input when the over-current condition is detected;
compensation circuitry configured to detect the modulation signal in the power input to the subsystem; and
limits management circuitry configured to control reduction of a processing load of the processing core after the time interval has elapsed and determining when the time interval has elapsed, the time interval beginning upon detection of the modulation signal in the power input, the limits management circuitry generating an alert when it is determined that the time interval has elapsed and sending the alert to the processing core to reduce the processing load of the processing core, the processing load being reduced by reducing an operating frequency of a clock signal supplied to the processing core.

9. The system of claim 8, wherein the subsystem is included in a system-on-a-chip (SoC), and the power input is an SoC power supply rail coupled to the power management integrated circuit.

10. The system of claim 9, wherein the power management integrated circuit is configured to detect an over-current condition on the SoC power supply rail, and to modulate the SoC supply rail with the modulation signal when the over-current condition is detected.

11. The system of claim 8, wherein the compensation circuitry is further configured to compensate in response to the modulation signal in the power input.

12. The system of claim 11, wherein the compensation circuitry comprises adaptive clock distribution circuitry configured to reduce an operating frequency of a clock signal supplied to the processing core in relation to a voltage reduction of the power input.

13. The system of claim 12, wherein the adaptive clock distribution circuitry is configured to detect the modulation signal by detecting a low voltage pulse.

14. The system of claim 13, wherein the adaptive clock distribution circuitry is configured to reduce the operating frequency of the clock signal during the low voltage pulse and restore the operating frequency of the clock signal following the low voltage pulse.

15. A system for power control in a subsystem of a portable computing device, comprising:
   means for modulating a signal in a power input to a subsystem when an over-current condition is detected;
   means for detecting the modulation signal in the power input to the subsystem;
   means for determining when a time interval has elapsed, the time interval beginning upon detection of the modulation signal in the power input;
   means for generating an alert when it is determined that the time interval has elapsed; and
   means for reducing a processing load of a processing core after the time interval in response to detection of the alert, wherein reducing the processing load comprises reducing an operating frequency of a clock signal supplied to the processing core.

16. The system of claim 15, wherein the means for detecting the modulation signal comprises means for detecting the modulation signal in a voltage supply rail received from a power management integrated circuit.

17. The system of claim 15, further comprising means for compensating in response to the modulation signal in the power input.

18. The system of claim 17, wherein the means for compensating in response to the modulation signal in the power input comprises means for reducing an operating frequency of a clock signal supplied to the processing core in relation to a voltage reduction of the power input.

19. The system of claim 18, wherein the means for detecting the modulation signal comprises means for detecting a low voltage pulse.

20. The system of claim 19, wherein the means for reducing the operating frequency of the clock signal comprises means for reducing the operating frequency of the clock signal during the low voltage pulse and restoring the operating frequency of the clock signal following the low voltage pulse.

21. The system of claim 20, wherein the means for reducing the processing load comprises means for reducing the operating frequency of the clock signal.

22. A system for power control in a portable computing device, comprising:
   a power management integrated circuit configured to provide a power supply rail, to detect an over-current condition on the power supply rail, and to modulate the power supply rail with a modulation signal when the over-current condition is detected; and
   a system-on-a-chip (SoC) having a subsystem, the subsystem having a power input coupled to the power supply rail, the subsystem comprising:
      a processing core;
      compensation circuitry configured to detect the modulation signal in the power input; and
      limits management circuity configured to time an interval beginning upon detection of the modulation signal in the power input, and to provide the alert to the processing core when the interval elapses; and
      the processing core is configured to reduce the processing load in response to the alert.

23. The system of claim 22, wherein the compensation circuitry is configured to detect the modulation signal by detecting a low voltage pulse.

24. The system of claim 23, wherein the processing core is configured to reduce the processing load by reducing an operating frequency of a clock signal supplied to the processing core.

25. The system of claim 22, wherein the compensation circuitry is further configured to compensate in response to the modulation signal in the power input.

26. The system of claim 25, wherein the compensation circuitry is configured to compensate in response to the modulation signal in the power input by reducing the operating frequency of the clock signal during the low voltage pulse and restoring the operating frequency of the clock signal following the low voltage pulse.

* * * * *